（12） United States Patent
Ahn (10) Patent No.: US 9,457,555 B2
(45) Date of Patent: Oct. 4, 2016

(54) FILM PEELING APPARATUS (71) Applicant: Samsung Display Co., Ltd., Yongin (KR)

(72) Inventor: Kyung Hyun Ahn, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/336,681

(22) Filed: Jul. 21, 2014

(65) Prior Publication Data
US 2015/0107782 A1    Apr. 23, 2015

(30) Foreign Application Priority Data

Oct. 22, 2013 (KR) .................. 10-2013-0126034

(51) Int. Cl.
| B32B 38/10 | (2006.01) |
| B32B 43/00 | (2006.01) |
| B32B 41/00 | (2006.01) |
| B65H 41/00 | (2006.01) |
| B65H 29/56 | (2006.01) |

(52) U.S. Cl.
CPC ............ B32B 43/006 (2013.01); B32B 41/00 (2013.01); B65H 29/56 (2013.01); B65H 41/00 (2013.01); B65H 2801/61 (2013.01); Y10T 156/1105 (2015.01); Y10T 156/1174 (2015.01); Y10T 156/1906 (2015.01); Y10T 156/1956 (2015.01)

(58) Field of Classification Search
CPC ............... B32B 38/10; B32B 43/006; Y10T 156/1956
USPC ................................. 156/715, 760
See application file for complete search history.

(56) References Cited

U.S. PATENT DOCUMENTS

| 4,724,032 | A | * | 2/1988 | Kay ........................ | 156/717 |
| 4,867,837 | A | * | 9/1989 | Seki et al. ............... | 156/754 |
| 4,880,488 | A | * | 11/1989 | Matsuo et al. ........... | 156/702 |
| 5,358,591 | A | * | 10/1994 | Candore ................... | 156/707 |
| 5,540,809 | A | * | 7/1996 | Ida et al. .................. | 156/760 |
| 5,824,184 | A | * | 10/1998 | Kamijo et al. ........... | 156/760 |
| 5,879,505 | A | * | 3/1999 | Fujisawa et al. ........ | 156/715 |
| 6,500,298 | B1 | * | 12/2002 | Wright et al. ............ | 156/708 |
| 8,029,642 | B2 | * | 10/2011 | Hagman .................... | 156/715 |
| 8,137,503 | B2 | * | 3/2012 | Hiranaka et al. ........ | 156/703 |
| 2003/0029562 | A1 | * | 2/2003 | Yotsumoto et al. ...... | 156/344 |
| 2006/0118228 | A1 | * | 6/2006 | Toyoda et al. ........... | 156/53 |
| 2008/0011420 | A1 | * | 1/2008 | Yoshizawa et al. ...... | 156/344 |
| 2009/0205781 | A1 | * | 8/2009 | Merrill et al. ........... | 156/344 |
| 2013/0048223 | A1 | * | 2/2013 | Ahn ........................ | 156/718 |

FOREIGN PATENT DOCUMENTS

| KR | 200422371 | 7/2006 |
| KR | 1020070050756 | 5/2007 |
| KR | 1020070112078 | 11/2007 |
| KR | 1020080066759 | 7/2008 |
| KR | 1020100078476 | 7/2010 |

* cited by examiner

*Primary Examiner* — Mark A Osele
*Assistant Examiner* — Nickolas Harm
(74) *Attorney, Agent, or Firm* — H.C. Park & Associates, PLC (57) ABSTRACT

A film peeling apparatus includes: a pair of rollers configured to peel films from a target object having the films adhered on surfaces thereof; a transporter configured to transport the target object toward the rollers; a sensor configured to obtain peeling target information; a calculator configured to calculate roller distance information or peeling condition information based on the peeling target information; and a controller configured to control a movement of the pair of rollers based on the roller distance information or the peeling condition information.

17 Claims, 10 Drawing Sheets

FILM PEELING APPARATUS

CROSS-REFERENCE TO RELATED APPLICATION

This application claims priority from and the benefit of Korean Patent Application No. 10-2013-0126034, filed on Oct. 22, 2013, which is hereby incorporated by reference for all purposes as if fully set forth herein.

BACKGROUND

1. Field

Exemplary embodiments of the present disclosure relate to a film peeling apparatus for peeling a film from a substrate for use in various industries including the electronics industry such as for manufacturing semiconductors or displays.

2. Discussion of the Background

A process for peeling a film from a substrate is used in many industries such as the food processing industry as well as the electronics industry including the semiconductor or display industry. For this purpose, film peeling apparatuses for peeling a film by moving the target object to peel between securely arranged rollers have been developed. Such film peeling apparatuses typically allow users to manually position the rollers within a predetermined distance and a speed range.

However, conventional film peeling apparatuses have the following drawbacks.

When a hybrid patterning system (HPS) is used particularly among the manufacturing methods of organic light emitting diodes (OLEDs), it is necessary to uniformly peel a donor film laminated on the substrate and a lower film provided for support and transport. However, for a conventional peeling apparatus, the movement of the rollers can only be performed by the manual manipulation of a user, and the movable distance and the speed range are also limited. Accordingly, it is difficult to perform fine control of the apparatus to uniformly peel the target object of which the surface may have foreign particles and uneven portions such as creases.

Further, when a peeling process is performed after a laser induced thermal imaging (LITI) process, various types of problems may occur: unevenness on the pixel definition layer (PDL) of the substrate, and tears of transferred organic films, which may be caused by various peeling marks and air trapping. Furthermore, foreign particles may also flow in and thus need to be fended off in the peeling process. Such problems in the peeling process may lead to defective substrates having bright or faded-out spots generated by open edges and point pressings, which may cause deterioration in quality in the overall OLED manufacturing process.

The above information disclosed in this Background section is only for enhancement of understanding of the background of the invention, and therefore it may contain information that does not form the prior art that is already known to a person of ordinary skill in the art.

SUMMARY

Exemplary embodiments of the present invention have been made in an effort to provide a film peeling apparatus having advantages of being capable of automatically controlling rollers by using peeling condition information calculated based on peeling target information such that the target object can be peeled in a peeling condition being uniformly maintained.

An exemplary embodiment of the present invention provides a film peeling apparatus including: a pair of rollers configured to peel films from a target object having the films adhered on surfaces thereof; a transporter configured to transport the target object toward the rollers; a sensor provided on a transport path of the target object and configured to sense peeling target information; a calculator configured to calculate roller distance information or peeling condition information based on the sensed peeling target information; and a controller configured to control a movement of the pair of rollers based on the roller distance information or the peeling condition information.

Another exemplary embodiment of the present invention provides a film peeling apparatus comprising: a roller configured to peel a film from a target object having the film adhered on a surface thereof; a transporter configured to transport the target object toward the roller; a sensor configured to obtain peeling target information from scanning the target object and the film and to transmit the peeling target information; a calculator configured to calculate peeling condition information based on the transmitted peeling target information and transmit the peeling condition information; and a controller configured to control a movement of the roller based on the transmitted peeling condition information.

Additional features of the invention will be set forth in the description which follows, and in part will be apparent from the description, or may be learned by practice of the invention.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification. Further, when the first part is described as being arranged "on" the second part, this indicates that the first part is arranged at an upper side or a lower side of the second part without the limitation to the upper side thereof on the basis of the gravity direction. It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1A:
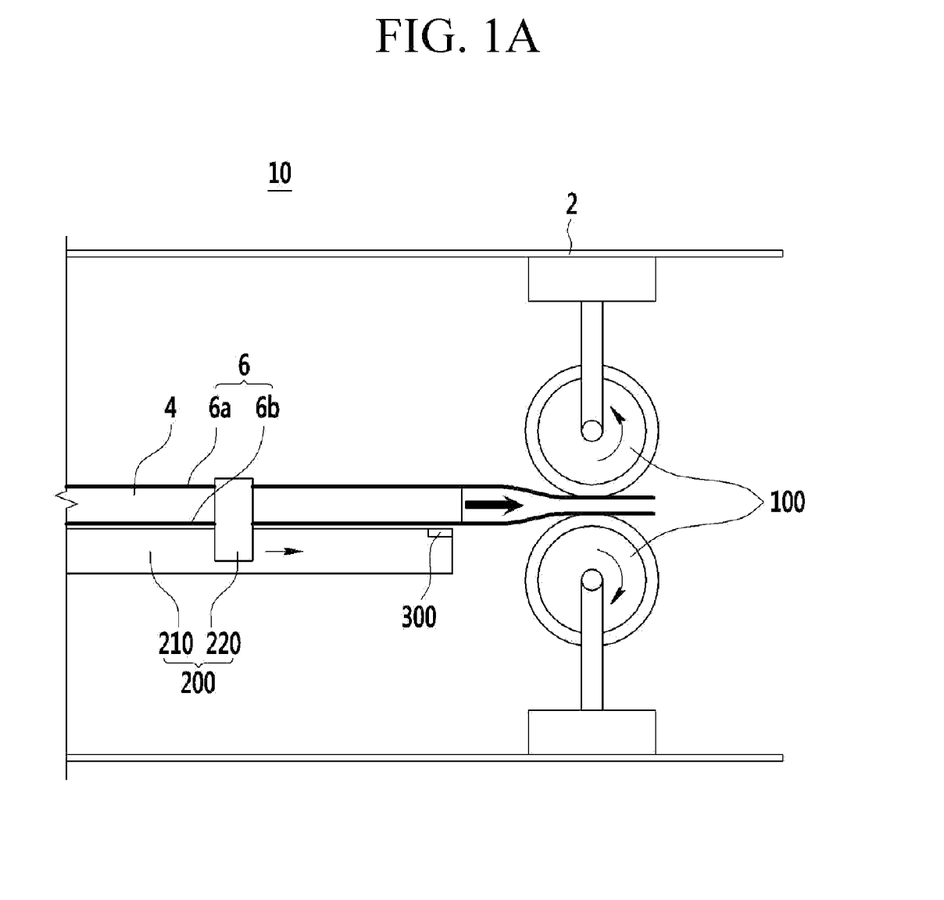
FIG. 1A and FIG. 1B are cross-sectional views showing an operation state of a film peeling apparatus in accordance with a first exemplary embodiment.
Figure 1B:
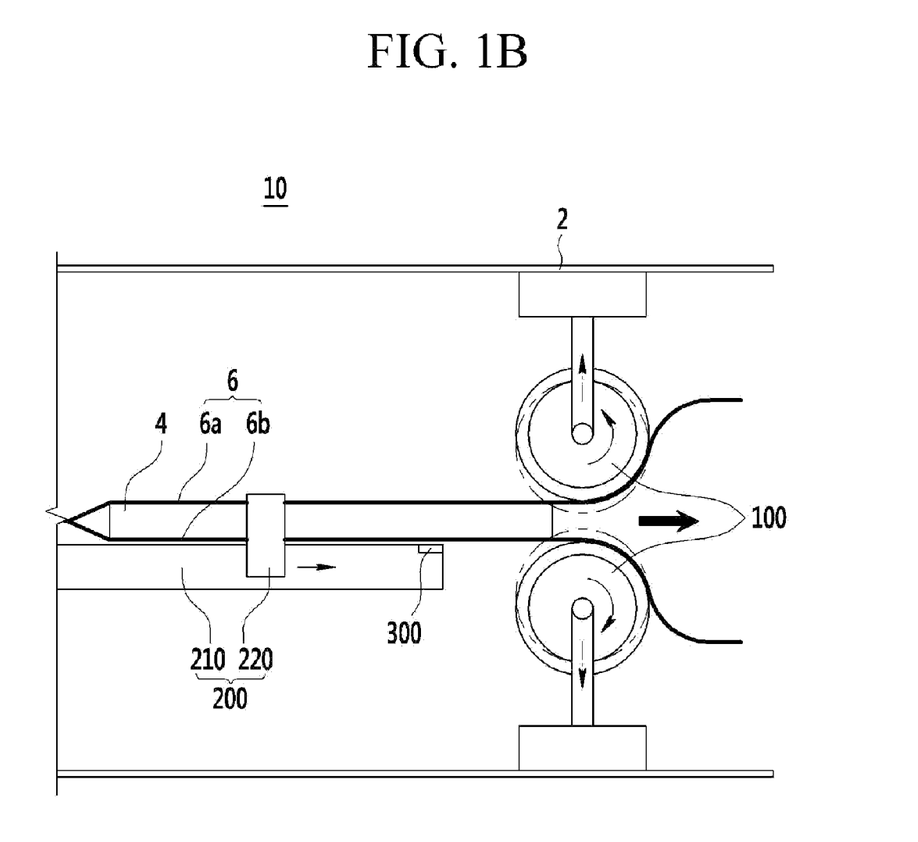

FIG. 1A and FIG. 1B are cross-sectional views showing a film peeling apparatus in operation in accordance with a first exemplary embodiment.

Referring to FIG. 1A and FIG. 1B, a film peeling apparatus 10 of the first exemplary embodiment may be mounted inside a housing 2. In this case, a target object 4 having surfaces on which films 6 are attached may be provided into the housing 2. The target object 4 may be in the form of a plate member and have surfaces on which the films 6 are attached. The target object 4 may be, for example, a substrate to be used in an organic light emitting diode (OLED), a liquid crystal display (LCD) or any other types of flat panel displays. Hereinafter, films 6 attached on the upper surface and the lower surface of the target object may be respectively referred to as "upper film 6a" and "lower film 6b." However, the present disclosure is not limited to the embodiments shown in FIGS. 1A and 1B (i.e., the films 6 are attached on both sides of the target object 4), and one or more films may be attached on only one surface of the target object 4.

Further, the direction in which the target object 4 is transported to a pair of rollers 100 is indicated by the bold arrow shown in FIG. 1A.

In accordance with one exemplary embodiment, the housing 2 may be equipped to be optionally closed and sealed so as to maintain a vacuum state of the inside thereof during a peeling operation of the films 6 from the target object 4. Herein, the housing 2 may be a vacuum chamber having a suitable configuration to perform a peeling operation. Accordingly, it is possible to prevent foreign particles, which may flow in from the outside, from being attached on the films 6 or the film peeling apparatus 10. The film peeling apparatus 10 may include the pair of rollers 100, a transporter 200, a sensor 300, a calculator 400 (see FIG. 3), and a controller 500 (see FIG. 3).

In accordance with one exemplary embodiment, the pair of rollers 100 may be mounted at an upper side and a lower side inside the housing 2, respectively, and may be arranged to face each other as shown in FIG. 1A. The upper one and the lower one of the rollers 100 may be respectively brought into contact with the upper film 6a and the lower film 6b to peel the films 6 from the target object 4. Herein, the pair of rollers 100 may be porous adsorptive rollers having surfaces in which fine holes are formed, but are not limited thereto. Accordingly, the upper film 6a and the lower film 6b coming into contact with the respective rollers 100 may be adsorbed or adhered onto the surfaces thereof to be peeled from the target object. The configuration of the porous adsorptive rollers and the peeling method using the same would be appreciable to one of ordinary skill in the art, and thus detailed descriptions thereof are not made.

In accordance with one exemplary embodiment, the pair of rollers 100 may be mounted inside the housing 2 such that the upper roller and the lower roller may respectively make linear movements, for example, upwardly and downwardly as shown in FIG. 1B when the target object 4 is fed into the gap between the rollers 100. Accordingly, the film peeling apparatus 10 can peel the films 6 of the target object 4 having various thicknesses.

The transporter 200 of the film peeling apparatus 10 in accordance with the present exemplary embodiment may transport the target object fed into the housing 2 to the front side thereof in the transport direction (i.e., toward the rollers 100). To that end, the transporter 200 includes a support member 210 and a transport member 220.

The support member 210 may be provided to extend toward the front side in the transport direction around the pair of rollers 100. In this case, the support member 210 may be formed in a plate shape so as to support the lower side of the target object. For example, the support member 210 may be a vacuum table having a surface in which a plurality of vacuum holes is formed. The support member 210 of the film peeling apparatus 10 in accordance with the present exemplary embodiment may horizontally extend toward the pair of rollers 100 vertically mounted, as shown in FIG. 1A, to transport the target object through the gap between the rollers 100. The mounting direction of the pair of rollers 100 and the extending direction of the support member 210, however, are not limited thereto.

In accordance with one exemplary embodiment, the transport member 220 may be mounted at a side of the support member 210 to come into contact with a side of the target object 4 and to be detached therefrom afterward. The transport member 220 of the film peeling apparatus 10 in accordance with the present exemplary embodiment may be a suitable type of transport clamp that is movably mounted at a side of the support member 210 to move along with the target object 4 toward the front in the transport direction by clamping the target object 4. Accordingly, the target object 4 can be transported toward the front in the transport direction. However, the configuration of the transport member 220 is not limited thereto. Alternatively, the transport member 220 may be a suitable type of rolling member mounted at an upper portion of the support member 210 to rollingly move the target object 4 toward the front in the transport direction.

Figure 2A:
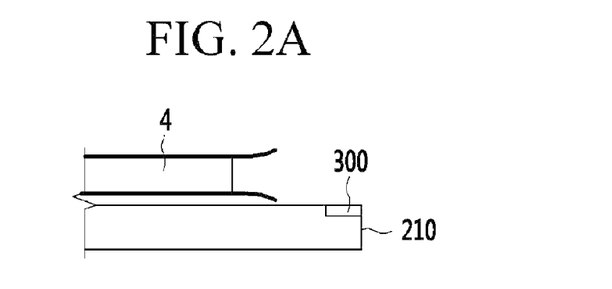
FIG. 2A, FIG. 2B, and FIG. 2C show a sensor which can be mounted at multiple portions on a supporter of the film peeling apparatus in accordance with the first exemplary embodiment.
Figure 2B:
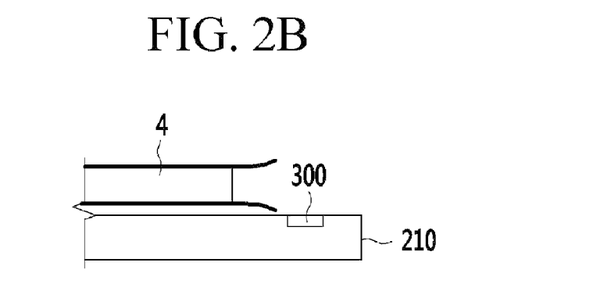
Figure 2C:
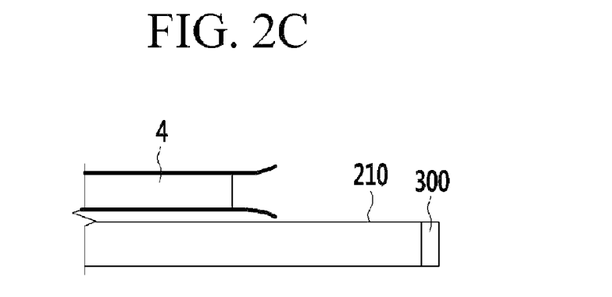

FIG. 2A, FIG. 2B, and FIG. 2C show a sensor mounted at multiple portions of the supporter 210 of the film peeling apparatus in accordance with the first exemplary embodiment.

The sensor 300 may be mounted at one or more points along the transport path of the target object 4 to detect the conditions of the peeling target 4 and obtain information from the target object 4. In accordance with one exemplary embodiment, the sensor 300 may be mounted at two or more portions on the transport path of the target object 4. The sensor 300 may include an optical sensor having a light source to collect peeling target information from the target object 4 by absorbing light reflected from the surface of the target object 4.

Referring to FIG. 2A, FIG. 2B, and FIG. 2C, the sensor 300 of the film peeling apparatus 10 in accordance with the first exemplary embodiment may be mounted on the upper surface of the support member 210 or one end portion of the support member 210 close to the front in the transport direction. However, while FIG. 2A, FIG. 2B, and FIG. 2C show examples of the mounting position of the sensor 300, the mounting position of the sensor 300 is not limited thereto. Alternatively, the sensor 300 may be mounted on an interior wall of the housing 2 or in the transporter 200 on the transport path of the target object 4 in a way to detect and obtain peeling target information from the upper film 6a and the lower film 6b.

Figure 3:
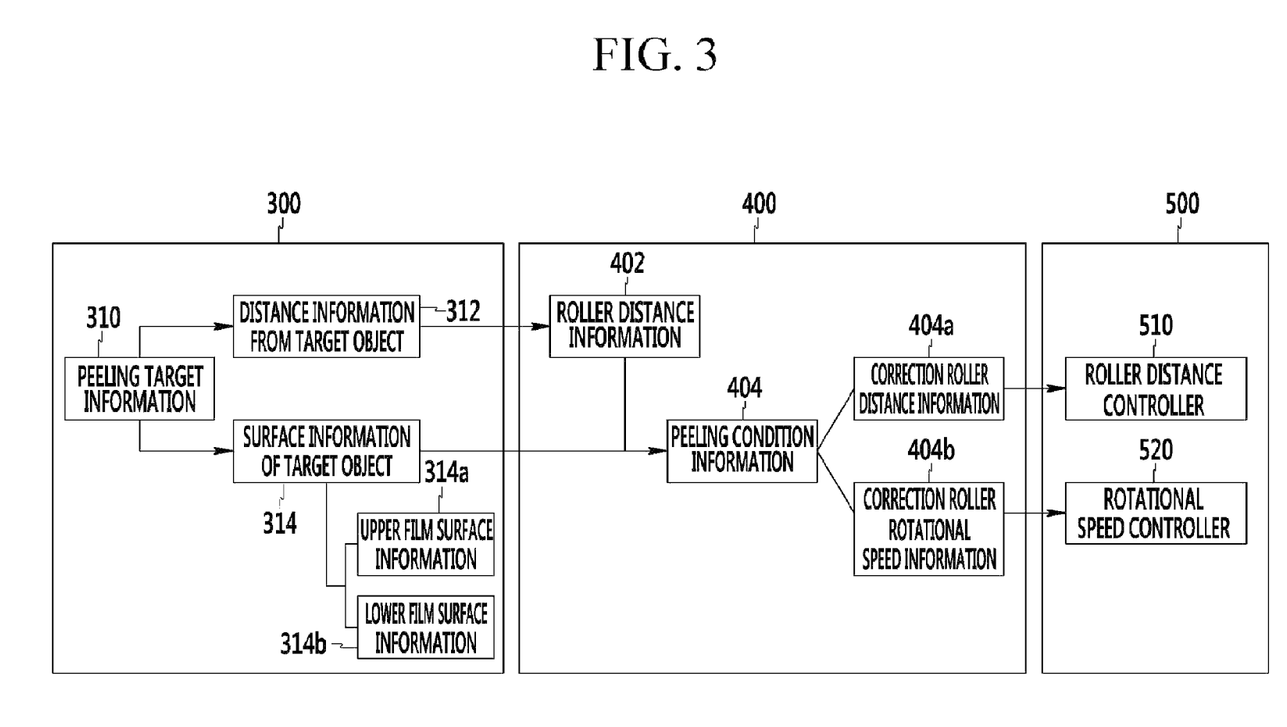
FIG. 3 is a block diagram showing a film peeling control operation of the film peeling apparatus in accordance with the first exemplary embodiment.

FIG. 3 is a block diagram showing a film peeling control operation of the film peeling apparatus in accordance with the first exemplary embodiment.

Referring to FIG. 2A, FIG. 2B, FIG. 2C, and FIG. 3, the sensor 300 can detect and obtain peeling target information 310 from the target object 4. Specifically, the optical sensor of the film peeling apparatus 10 in accordance with the present exemplary embodiment can collect real-time peeling target information 310 from the target object 4 by continuously emitting light. In this case, the peeling target information 310 may include distance information 312 from the target object 4 and surface information 314 of the target object 4.

The distance information 312 from the target object 4 may include information related to the shortest distance between the pair of rollers 100 and the target object 4. In this case, the distance information 312 from the target object 4 of the film peeling apparatus 10 in accordance with the present exemplary embodiment may be obtained by detecting the time that it takes for the light emitted to the target object 4 and the pair of rollers 100 to be reflected therefrom and return.

The surface information 314 of the target object 4 may contain information, for example, relating to surface unevenness, fine creases, step portions, or curves caused by foreign particles which may exist on the surface of the films 6 attached on the target object 4. In this case, the surface information 314 of the target object 4 of the film peeling apparatus 10 may be obtained, for example, by measuring how much of the light emitted from the light source of the optical sensor is reflected from the target object 4 and re-introduced into the optical sensor. In other words, the surface information 314 of the target object 4 may be obtained by detecting the incident amount and/or incident angle of the reflected light that is introduced into the optical sensor.

The sensor 300 of the film peeling apparatus 10 in accordance with the present exemplary embodiment may be mounted at two or more portions to obtain upper surface information and lower surface information of the target object 4. In other words, the surface information 314 of the target object 4 may include upper film surface information 314a and lower film surface information 314b.

The calculator 400 can calculate roller distance information 402 and peeling condition information 404 to be used for peeling the target object 4 in real time based on the peeling target information 310 sensed through the sensor 300.

In accordance with one exemplary embodiment, the roller distance information may contain the shortest distance between the pair of rollers 100. The roller distance information 402 may be calculated based on the distance information 312 from the target object 4 sensed by the sensor 300 using any suitable method. One of ordinary skill in the art will readily appreciate how the distance between the roller 100 and the target object 4 can be calculated, and thus detailed descriptions thereof are not made.

In accordance with one exemplary embodiment, the peeling condition information 404 may be calculated based on the roller distance information 402 calculated by the calculator 400 and the surface information 314 of the target object 4 sensed by the sensor 300. Herein, the peeling condition information 404 may contain information for adjusting the movement of the pair of rollers 100 according to the real-time surface information 314 to uniformly maintain peeling conditions such as the peeling angle, the peeling speed, and the peeling force while the peeling operation of the target object 4 is performed. In this case, the peeling condition information 404 of the film peeling apparatus 10 in accordance with the present exemplary embodiment may contain correction roller distance information 404a serving as a correction value for adjusting the distance between the pair of rollers 100, and correction roller rotational speed information 404b serving as a correction value for adjusting the rotational speed of the rollers 100.

In accordance with one exemplary embodiment, the controller 500 may continuously control the movement of the pair of rollers 100 based on the peeling condition information 404 calculated by the calculator 400. To that end, the controller 500 of the film peeling apparatus 10 in accordance with the present exemplary embodiment may include a roller distance controller 510 and a rotational speed controller 520.

The roller distance controller 510 may be mounted in each of the pair of rollers 100 as shown in FIG. 1A to control and continuously adjust the roller distance according to the peeling condition information 404, for example, by linearly moving the rollers 100 upward and downward as shown in FIG. 1B. In this case, the roller distance controller 510 can control the upper roller and the lower roller independently to move upward and downward.

Accordingly, it is possible to deal with fine creases or step portions existing on the surfaces of the target object 4 to be fed into the gap between the pair of rollers 100.

For example, when the sensor detects an uneven portion on the films 6 such as a bump-out at a distance D (from the rollers 100) with a height H (from the uniform surface) and a length L (in the transport direction), the sensor 300 transmits this information of the uneven portion to the calculator 400. The calculator 400 calculates, based on this information and the linear speed of the rollers 100, when and how much the rollers 100 should move and transmits the calculation results to the controller 500. The controller 500 may adjust the gap between the rollers 100 (e.g., widens the gap by H) after the uniform portion (D) passed and while the uneven portion (L) passes through the gap by moving either or both of the rollers 100.

The rotational speed controller 520 may be connected to each rotational shaft of the pair of rollers 100 to continuously control the rotational speed of the rollers 100 to be corrected. Further, the rotational speed controller 520 may be connected to the respective rotational shafts of the upper roller and the lower roller to independently control the rotational speeds thereof. In addition, the rotational speed controller 520 can control the rotational directions of the rollers 100 as shown in FIG. 1B. Accordingly, it is possible to uniformly maintain the peeling speed and the peeling angle on the target object 4 and/or the peeling force applied to the target object 4.

Hitherto, the configuration of the film peeling apparatus 10 in accordance with the first exemplary embodiment has been described. Hereinafter, an operation of the film peeling apparatus 10 in accordance with the first exemplary embodiment will be described.

Referring back to FIG. 1A, the target object 4 having the films 6 attached on its surfaces is provided into the housing 2. In this case, the lower side of the target object 4 may be supported by the support member 210, while the lateral portion thereof may be secured by the transport member 220. The rollers 100 may be arranged in the front in the transport direction of the support member 210. The upper film 6a and the lower film 6b respectively come into contact with the upper roller and the lower roller.

When the target object 4 is moved along with the transport member 220 to the front in the transport direction toward the pair of rollers 100, the sensor 300 provided on the transport path of the target object 4 continuously sense the shortest distance between the target object 4 and the pair of rollers 100 and also the surface state of the upper film 6a and the lower film 6b. In this case, the calculator 400 may calculate the roller distance information 402 based on the information obtained by the sensor 300 and may continuously calculate the peeling condition information 404 by using the roller distance information 402 and the surface information 314 of the target object 4.

In accordance with one exemplary embodiment, the controller 500 may adjust the distance between the rollers 100 as shown in FIG. 1B and/or the rotational speeds of the rollers 100 to control the peeling conditions of the target object 4 fed into the gap between the pair of rollers 100 in real time according to the peeling information 404.

Hitherto, the configuration and the operation of the film peeling apparatus 10 in accordance with the first exemplary embodiment have been described. Hereinafter, a configuration and an operation of a film peeling apparatus 10' in accordance with a second exemplary embodiment will be described. In describing the film peeling apparatus 10' in accordance with the second exemplary embodiment, the same configurations as those of the film peeling apparatus 10 of the first exemplary embodiment are not repeatedly described, and the differences between them will be on focus.

Figure 4A:
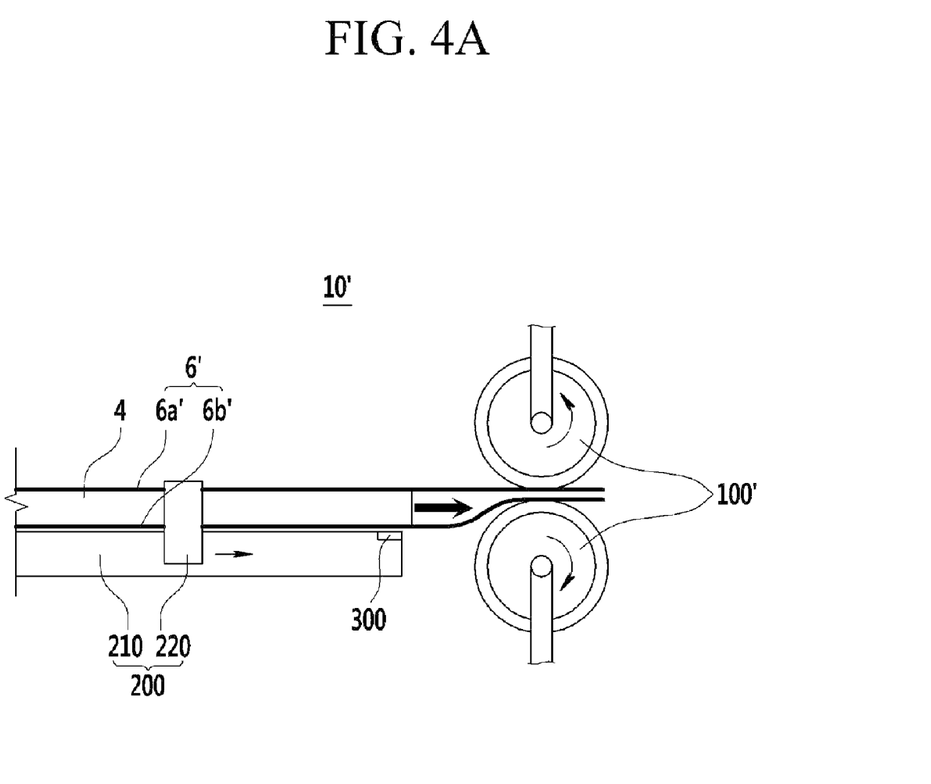
FIG. 4A and FIG. 4B are cross-sectional views showing an operation state of a film peeling apparatus in accordance with a second exemplary embodiment.
Figure 4B:
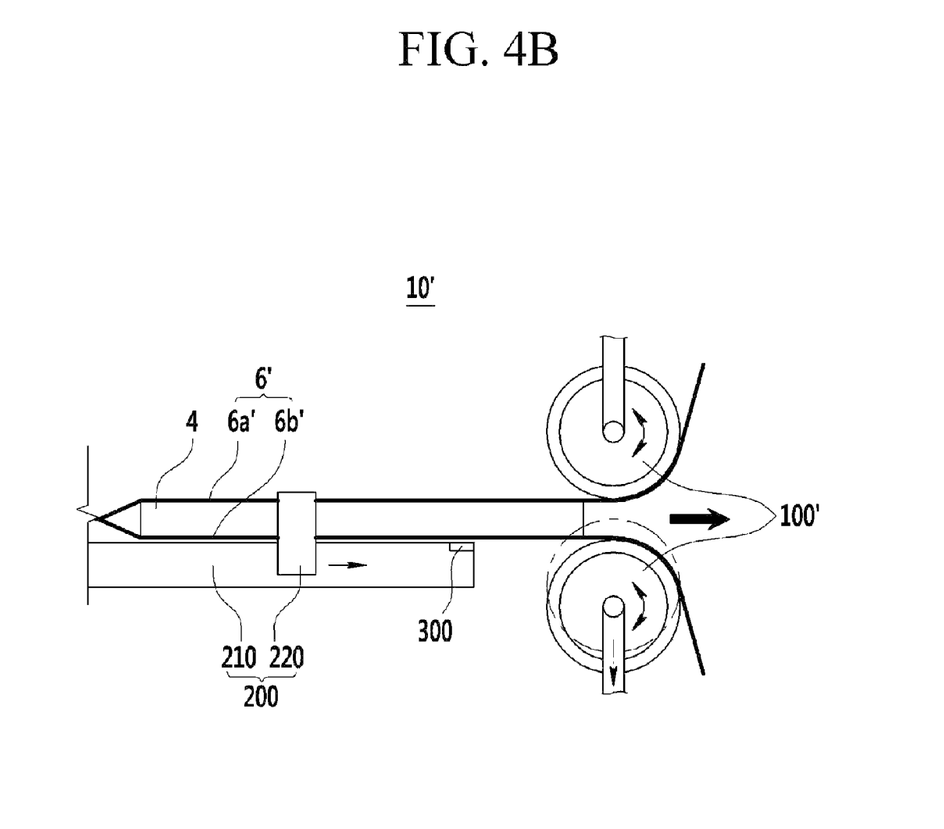

FIG. 4A and FIG. 4B are cross-sectional views showing the film peeling apparatus 10' in operation in accordance with the second exemplary embodiment.

Referring to FIG. 4A and FIG. 4B, in the film peeling apparatus 10' in accordance with the second exemplary embodiment, a pair of rollers 100' may be different from the pair of rollers 100 in accordance with the first exemplary embodiment for its operation method.

The upper one and the lower one of the pair of rollers 100' may be respectively brought into contact with an upper film 6a' and a lower film 6b'. In this case, films 6' may be transported to the rollers 100' while being drawn toward the upper side of the target object 4, unlike in FIG. 1A. The lower one of the rollers 100' of the film peeling apparatus 10' in accordance with the second exemplary embodiment may be positioned at a higher height than that of the lower roller shown in FIG. 1A so as to contact and draw the lower film 6b' toward the upper film 6a'.

Referring to FIG. 4B, when the target object 4 is fed into the gap between the pair of rollers 100', only the lower one of the rollers 100' may make linear vertical moves to peel the target object 4 to maintain uniform peeling conditions, unlike in the operation shown in FIG. 1B. The upper one of the rollers 100' may be rotated at a fixed position without being vertically moved, as shown in FIG. 4B. In this case, the roller distance controller for adjusting the roller distance according to the peeling conditions may be mounted only in the lower one of the rollers 100'.

The films 6' of the second exemplary embodiment are not limited to the foregoing description: the lower film 6b' drawn toward the film 6a' near the upper side of the target object 4. Alternatively, the lower roller may be securely disposed, and the roller distance controller may be mounted in the upper roller that is vertically movably disposed, so as to control the movement of the upper one of the rollers 100'.

As such, the film peeling apparatus 10' of the second exemplary embodiment can peel the films 6' from the target object 4 with the peeling conditions uniformly maintained by controlling only one of the rollers 100' to vertically move.

Hitherto, the operation of the film peeling apparatus 10' of the second exemplary embodiment has been described. Hereinafter, a configuration of a pair of rollers 100" in accordance with a third exemplary embodiment will be described. In describing the pair of rollers 100" in accordance with the third exemplary embodiment, the same configurations as those of the pair of rollers 100 of the first and second exemplary embodiments are not repeatedly described, and the differences between them will be on focus.

Figure 5:
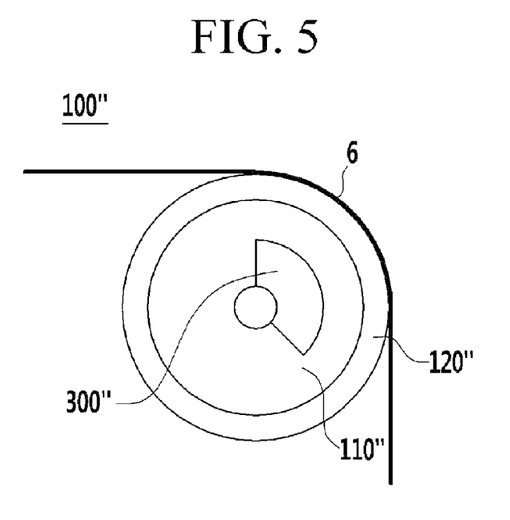
FIG. 5 is a cross-sectional view showing a roller of a film peeling apparatus and a sensor mounted inside the roller in accordance with a third exemplary embodiment.

FIG. 5 is a cross-sectional view showing a roller of a film peeling apparatus and a sensor mounted inside the roller in accordance with a third exemplary embodiment.

Referring to FIG. 5, the rollers 100" of the third exemplary embodiment may include an internal member 110" formed in a way to surround a rotational shaft thereof, and an external member 120" transparently formed in a way to surround the internal member 110".

As shown in FIG. 5, a sensor 300" of the third exemplary embodiment may be mounted inside the internal member 110". In this case, the sensor 300" may be, for example, in a circular arc shape formed from the rotational shaft toward the external member 120". The sensor 300" may be an optical sensor having a light source therein, and the internal member 110" and the external member 120" may have excellent light transmittance. Accordingly, the films 6 may be sensed by controlling the light emitted from the light source located inside the sensor 300" to pass through the external member 120" and the internal member 110", so that the light reaches the films 6 initially attached on and peeled from the external member 120" and then is reflected from the films 6 and returns to the sensor 300".

The sensor 300" of the third exemplary embodiment may be mounted inside the roller 100" as well as at a side of the transporter 200 located on the transport path of the target object 4 or on the interior wall of the housing 2. Accordingly, it is possible to more precisely sense continuous peeling condition information of the target object 4 transported to the rollers 100".

Hitherto, the configuration of the pair of rollers 100" in accordance with the third exemplary embodiment has been described. Hereinafter, a configuration and an operation of a film peeling apparatus 10''' in accordance with a fourth exemplary embodiment will be described. In describing the film peeling apparatus 10''' in accordance with the fourth exemplary embodiment, different configurations will be on focus, and the same configurations as those of the film peeling apparatus 10 of the first exemplary embodiment will not be repeatedly described.

Figure 6A:
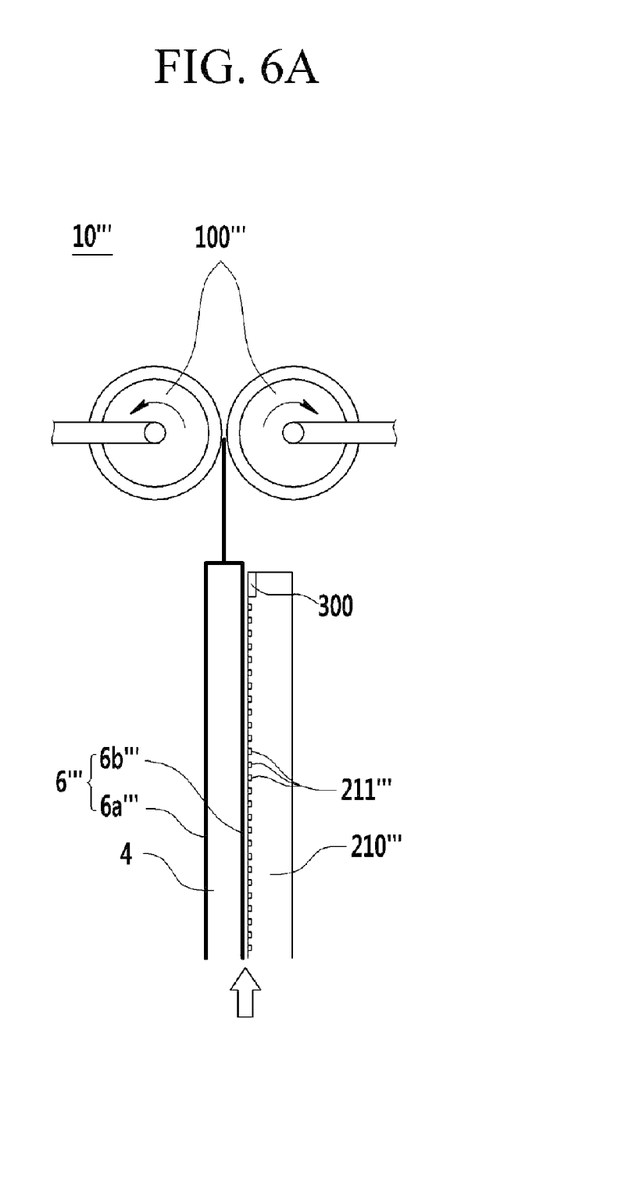
FIG. 6A, FIG. 6B, and FIG. 6C are cross-sectional views showing an operation state of a film peeling apparatus in accordance with a fourth exemplary embodiment.
Figure 6B:
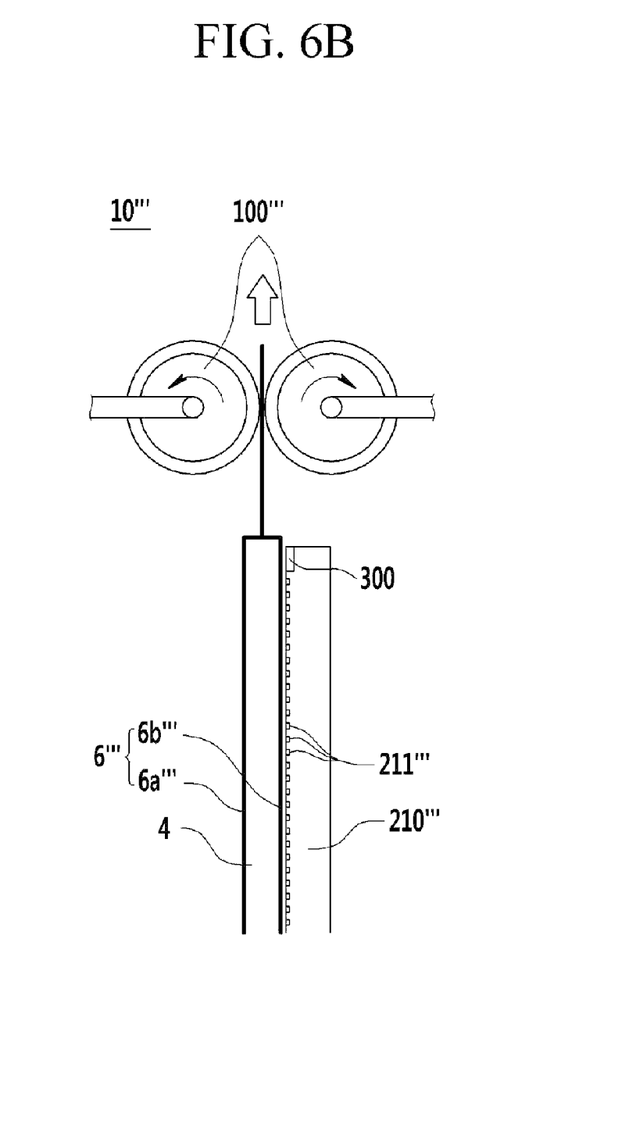
Figure 6C:
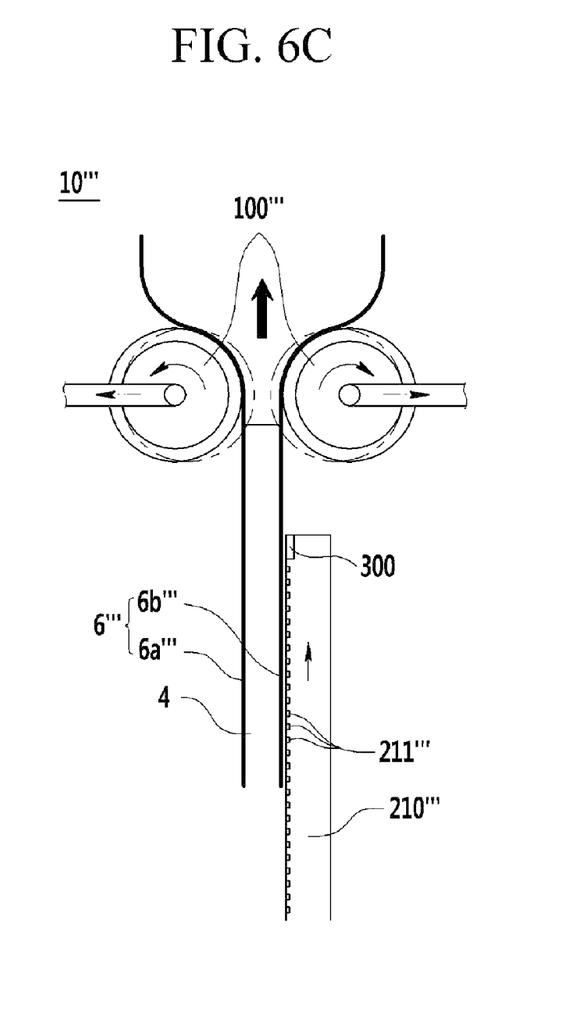

FIG. 6A, FIG. 6B, and FIG. 6C are cross-sectional views showing a film peeling apparatus in operation in accordance with a fourth exemplary embodiment.

Referring to FIG. 6A, FIG. 6B, and FIG. 6C, a pair of rollers 100''' of the film peeling apparatus 10''' in accordance with the fourth exemplary embodiment may be horizontally disposed, unlike the pair of rollers of the film peeling apparatus 10 in accordance with the first exemplary embodiment.

Further, the target object 4 of the fourth exemplary embodiment may be vertically disposed in a way to be fed into the gap between the pair of rollers 100'''.

In this case, as shown in FIG. 6A, a plurality of holes 211''' which can adsorb the target object 4 may be formed in the surface of a support member 210''' which is brought into contact with the target object 4 such that the support member 210''' can be moved toward the pair of rollers 100''' along with the target object 4 in accordance with the fourth exemplary embodiment. The support member 210''' of the fourth exemplary embodiment may be a vacuum table which can maintain the target object 4 to be attached thereto by continuously applying suction pressure through the holes 211'''. However, the support member 210''' is not limited to that example, and a suitable mechanism to maintain the attachment between the support member 210''' and the target object 4 may be used. Further, the support member 210''' may be any device that can be vertically moved together with the target object 4 as described above. Accordingly, it is possible to transport the target object 4 to the front in the transport direction without additionally using the transport member 220.

In accordance with one exemplary embodiment, films 6''' of the fourth exemplary embodiment may completely surround and seal the target object 4 by coupling between the upper film 6a''' and the lower film 6b'''. In this case, the films 6''' of the fourth exemplary embodiment may be physically or chemically adhered to each other by using various methods such as a pressure sensitive adhesive on the films, a thermal adhesive at the end portions of the films, a vacuum differential pressure adhesive, and an inner magnetic adhesive of a film material for the upper film 6a''' and the lower film 6b'''.

Referring to FIG. 6B, when approaching the rollers 100''', the support member 210''' transported together with the target object 4 can stop moving, and the target object 4 can be lifted into the gap between the rollers 100''' by the rotational force of the rollers 100''' coming into contact with the films 6'''. In this case, the support member 210''' may continuously generate suction pressure through the holes 211''' to prevent the target object 4 from dropping down.

The suction pressure through the holes 211''' may be controlled so as to not hinder the rising movement of the target object 4 into the gap between the rollers 100'''.

Referring to FIG. 6C, the distance between the left and right rollers 100''' and/or the rotational speeds of the rollers 100''' may be adjusted to uniformly maintain the peeling conditions of the target object 4 fed into the gap between the rollers 100'''. Accordingly, it is possible to peel the films 6''' from the target object 4 vertically moving into the gap between the rollers 100''' while maintaining optimized peeling conditions.

The film peeling apparatus 10''' of the fourth exemplary embodiment can easily peel the upper film 6a''' and the lower film 6b''', by various methods, from the target object 4 that is vertically transported as shown in FIG. 6C.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A film peeling apparatus, comprising:
   a pair of rollers configured to peel films from a target object having the films adhered on surfaces thereof;
   a transporter configured to transport the target object toward the rollers;
   a sensor configured to obtain peeling target information;
   a calculator configured to calculate roller distance information or peeling condition information based on the peeling target information; and
   a controller configured to control a movement of the pair of rollers based on the roller distance information, the peeling condition information, or both the roller distance information and the peeling condition information,
   wherein the transporter extends in a transport direction toward the pair of the rollers and is configured to support the target object,
   wherein the transporter comprises a support member configured to adhere the target object thereto and to move in the transport direction along with the target object, and
   wherein the pair of rollers comprise:
   a rotational shaft;
   an internal member surrounding the rotational shaft; and
   a transparent external member surrounding the internal member, and
   wherein the sensor is mounted inside the internal member.

2. The film peeling apparatus of claim 1, wherein the sensor is mounted in or on an upper surface of the support member.

3. The film peeling apparatus of claim 1, wherein the transporter comprises a support member, and
   wherein the transporter is mounted at a side of the support member, and further comprises a transport member configured to detachably contact the target object to transport the target object toward the pair of rollers.

4. The film peeling apparatus of claim 1, wherein the sensor comprises an optical sensor.

5. The film peeling apparatus of claim 4, wherein the optical sensor is configured to measure light reflected from the target object and to obtain at least one of distance information from the target object and surface information of the target object.

6. The film peeling apparatus of claim 5, wherein the optical sensor is configured to sense at least one of incident amount of the reflected light and incident angle of the reflected light.

7. The film peeling apparatus of claim 4, wherein the optical sensor is mounted in at least one of the pair of rollers, and
   the at least one of the pair of rollers comprises a transparent member through which light passes through.

8. The film peeling apparatus of claim 1, wherein the peeling target information comprises distance information from the target object, surface information of the target object, or both the distance information and the surface information.

9. The film peeling apparatus of claim 8, wherein the calculator is configured to calculate peeling condition information based on the surface information of the target object, the roller distance information therefrom, or both the surface information and the roller distance information.

10. The film peeling apparatus of claim 1, wherein the controller comprises:

a roller distance controller configured to control a distance between the pair of rollers by linearly moving the pair of rollers; and a rotational speed controller configured to control a rotational movement of the pair of rollers, wherein the roller distance information comprises information about the distance between the pair of rollers.

11. The film peeling apparatus of claim 10, wherein the peeling condition information comprises:

a correction roller distance for controlling the roller distance controller; and a correction roller rotational speed information for controlling the rotational speed controller.

12. The film peeling apparatus of claim 10, wherein the roller distance controller is mounted at the respective rollers.

13. The film peeling apparatus of claim 10, wherein the roller distance controller is mounted at one of the rollers.

14. The film peeling apparatus of claim 13, wherein the peeling target information comprises a size of an uneven portion on the film and a distance from the roller, and the peeling condition information comprises the movement of the roller and timing of the movement based on the size of the uneven portion and the distance.

15. A film peeling apparatus, comprising:

a roller configured to peel a film from a target object having the film adhered on a surface thereof;

a transporter configured to transport the target object toward the roller;

a sensor configured to obtain peeling target information from scanning the target object and the film and to transmit the peeling target information;

a calculator configured to calculate peeling condition information based on the transmitted peeling target information and transmit the peeling condition information; and a controller configured to control a movement of the roller based on the transmitted peeling condition information, wherein the transporter extends in a transport direction toward the pair of the rollers and is configured to support the target object, wherein the transporter comprises a support member configured to adhere the target object thereto and to move in the transport direction along with the target object, and wherein the pair of rollers comprise:
a rotational shaft;
an internal member surrounding the rotational shaft; and
a transparent external member surrounding the internal member, and wherein the sensor is mounted inside the internal member.

16. The film peeling apparatus of claim 15, wherein the transporter comprises holes on a contact surface thereof through which suction pressure is to be applied in order to adhere the target object to the contact surface.

17. A film peeling method, comprising:

transporting a target object having a film adhered on a surface thereof toward a roller configured to peel the film from the target object;

obtaining peeling target information from scanning the target object and the film and transmitting the peeling target information;

calculating peeling condition information based on the transmitted peeling target information and transmitting the peeling condition information;

controlling a movement of the roller based on the transmitted peeling condition information, and extending a transporter in a transport direction toward the pair of the rollers, the transporter being configured to support the target object, wherein the transporter comprises a support member configured to adhere the target object thereto and to move in the transport direction along with the target object, and wherein the pair of rollers comprise:
a rotational shaft;
an internal member surrounding the rotational shaft; and
a transparent external member surrounding the internal member, and wherein the sensor is mounted inside the internal member.

* * * * *